United States Patent
Sedlacek

(10) Patent No.: US 8,166,100 B2
(45) Date of Patent: Apr. 24, 2012

(54) CROSS SITE, CROSS DOMAIN SESSION SHARING WITHOUT DATABASE REPLICATION

(75) Inventor: Vladimir Sedlacek, Popice (CZ)

(73) Assignee: AVG Technologies CZ, S.R.O. (CZ)

( * ) Notice: Subject to any disclaimer, the term of this patent is extended or adjusted under 35 U.S.C. 154(b) by 464 days.

(21) Appl. No.: 12/548,587

(22) Filed: Aug. 27, 2009

(65) Prior Publication Data
US 2010/0057829 A1 Mar. 4, 2010

Related U.S. Application Data

(60) Provisional application No. 61/092,481, filed on Aug. 28, 2008.

(51) Int. Cl.
*G06F 15/173* (2006.01)
(52) U.S. Cl. ............................................. 709/202
(58) Field of Classification Search ............... 714/6.1, 714/6.2, 6.3, 11; 709/202, 228, 238
See application file for complete search history.

(56) References Cited

U.S. PATENT DOCUMENTS

| 7,000,016 | B1 * | 2/2006 | Vanderbeck et al. | 709/226 |
|---|---|---|---|---|
| 7,111,144 | B2 * | 9/2006 | Hardman et al. | 711/173 |
| 7,246,256 | B2 * | 7/2007 | De La Cruz et al. | 714/4.11 |
| 7,526,551 | B1 * | 4/2009 | Islam et al. | 709/226 |
| 7,636,764 | B1 * | 12/2009 | Fein et al. | 709/212 |
| 7,647,460 | B1 * | 1/2010 | Wilson et al. | 711/162 |
| 7,870,044 | B2 * | 1/2011 | Robertson | 705/34 |
| 7,996,525 | B2 * | 8/2011 | Stienhans et al. | 709/224 |
| 8,037,187 | B2 * | 10/2011 | Dawson et al. | 709/226 |
| 2003/0014526 | A1 | 1/2003 | Pullara et al. | |
| 2007/0198721 | A1 | 8/2007 | Ikawa et al. | |

FOREIGN PATENT DOCUMENTS

WO 02/15526 A1 2/2002

* cited by examiner

*Primary Examiner* — David Eng
(74) *Attorney, Agent, or Firm* — Pepper Hamilton LLP

(57) ABSTRACT

A method of providing access to data via a public communications network includes the receiving a first data session request having a storage group mark, the storage group mark defining a server storage group, a load balancer route the request to a first server that processes request and any related session information, storing any altered first session data in a data storage. The load balancer receives a second request, wherein the second request also has the same storage group mark. The load balance selects a second server to respond to the second request. As before, the second server processes the second request and the altered first session data loaded from the data storage. After processing, the second server stores any altered second session data in the stored data on the first server as well as the second server and returns the altered second session data.

17 Claims, 3 Drawing Sheets

CROSS SITE, CROSS DOMAIN SESSION SHARING WITHOUT DATABASE REPLICATION

CROSS REFERENCE TO RELATED APPLICATIONS

This application claims the priority benefit of U.S. Provisional Application No. 61/092,481 filed Aug. 28, 2008.

BACKGROUND

The present application relates to digital communications network traffic session information collection, maintenance and sharing, and more specifically to cross domain session information collection, maintenance and sharing.

A domain, or domain name, is used in digital communications networks, e.g., the Internet, to identify a specific host or site. A domain generally appears in a uniform resource locator (URL), and may be an indicator of the name of the host, the name of a product or service, or another identifier. For example, in the URL www.google.com, Google® is the domain and name of the host.

Due to high traffic either by consumers, businesses, other domains, or various other reasons (collectively referred to as "clients"), many domains have high usage demands. This generally results in a domain owner (e.g., an individual corporation) developing a large network infrastructure including multiple servers for handling incoming requests, data servers for storing information that may be requested by a client, and a load balancer for receiving all incoming client requests and sending the requests to a server that currently has the bandwidth capability to handle the request. To maintain a high level of performance, the network infrastructure may need to expand along with the associated domain usage demands. For example, additional servers may be needed to handle incoming requests and additional data servers may be needed to store data.

Some domains, such as online retailers and auction sites, store session information related to an individual client in one or more session databases. This information may be related to previous actions the client has taken while visiting the domain. For example, if the domain is an online retailer, the session information may include previous purchases, previous queries, and other information associated with the client. The client receives a cookie with a session ID number, and this number is used to retrieve the session information from the session database(s).

FIG. 1 illustrates a traditional domain network infrastructure 100. Various clients 102a-n connect to the domain 100 via a load balancer 104. It should be noted that the infrastructure 100 shown in FIG. 1 is shown by way of example only. Regardless of the actual infrastructure, the clients 102a-n would only communicate with a device configured to receive and route incoming requests such as the load balancer 104. The load balancer 104 routes a request to either server 106a or 106b. For exemplary purposes, the load balancer 104 routes a first request to the server 106a. Based upon any session information contained in the first request (e.g., through a session ID number contained in a header of the first request), the server 106a requests any related session information from database server 108. The database server The results of the first request are returned to the requesting client (e.g., client 102a) via the load balancer 104. Additionally, updated session information is forwarded from the server 106a to the database 110 via the database server 108. When the same client (e.g., client 102a) makes an additional request, the updated session information is loaded from database 110.

A domain infrastructure such as infrastructure 100 has several problems. One problem is the database server 108 and database 110 must be sized to handle traffic quickly enough such that no bottlenecks occur. As each server 106a and 106b utilizes the same database server 108, the database server must be able to handle a large number of requests. One solution is to use multiple database servers. However, this solution requires multiple databases. In this solution, each database must contain a redundant copy of information such that any session ID, regardless of which database it originated in, is stored and accessible by both database servers. Any communication issues between the two databases, however, will lead to data inconsistencies between stored session information.

Additionally, this solution is single domain oriented. It would be impossible to transfer any incoming requests to another load balancer in an alternate location unless the database server is accessible from the alternate location or a replicated database exists in the alternate location. However, having multiple databases again leads to data consistency issues.

SUMMARY

The invention described in this document is not limited to the particular systems, methodologies or protocols described, as these may vary. The terminology used herein is for the purpose of describing particular embodiments only, and is not intended to limit the scope of the present disclosure.

It must be noted that as used herein and in the appended claims, the singular forms "a," "an," and "the" include plural reference unless the context clearly dictates otherwise. Unless defined otherwise, all technical and scientific terms used herein have the same meanings as commonly understood by one of ordinary skill in the art. As used herein, the term "comprising" means "including, but not limited to."

In one general respect, the embodiments disclose a method of providing access to data via a public communications network. The method includes the steps of receiving, by a first load balancer, a first data session request having a storage group mark; routing, by the first load balancer, the first data session request to a first domain content server that has stored data that corresponds to the storage group mark; retrieving, by the first domain content server from the stored data, first session data that is responsive to the first data session request; processing the first session data to result in altered first session data; storing, by the first domain content server, the altered first session data in the stored data; receiving, by the first load balancer, a second data session request, wherein the second data session request also has the storage group mark; selecting, by the first load balancer, a second domain server to respond to the second data session request; retrieving, by the second domain content server from the stored data in the first domain content server, second session data that is responsive to the second data session request; processing the second session data to result in altered second session data; storing the altered second session data in the stored data on the first domain content server; and returning, by the second domain content server to the first load balancer, the altered second session data.

In another general respect, the embodiments disclose a system for providing access to data via a communications network. The system includes at least one first load balancer configured to receive data session requests from at least one client; a first plurality of servers operably connected to the at least one first load balancer, the first plurality of servers being operably configured into at least two storage groups with at least two servers per storage group, wherein each server has a local database configured to store information related to data session information as well as storage group information; and a plurality of server agents, wherein each server has a unique server agent, the server agents configured to communicate with other server agents associated with servers belonging to the same storage group.

In another general respect, the embodiments disclose a method of providing access to data via a public communications network. The method includes the steps of receiving, by a first load balancer, a first data session request having a storage group mark; routing, by the first load balancer, the first data session request to a first domain content server that has stored data that corresponds to the storage group mark; retrieving, by the first domain content server from the stored data, first session data that is responsive to the first data session request; processing the first session data to result in altered first session data; storing, by the first domain content server, the altered first session data in the stored data; receiving, by a second load balancer, a second data session request, wherein the second data session request has a second storage group mark; selecting, by the second load balancer, a second domain server to respond to the second data session request; retrieving, by the second domain content server second session data that is responsive to the second data session request; processing the second session data to result in altered second session data; storing the altered second session data in the stored data on the second domain content server; notifying the first domain content server to delete any session data related to the first request; and returning, by the second domain content server to the second load balancer the altered second session data.

BRIEF DESCRIPTION OF THE DRAWINGS

Aspects, features, benefits and advantages of the present invention will be apparent with regard to the following description and accompanying drawings, of which.

DETAILED DESCRIPTION

Figure 2:
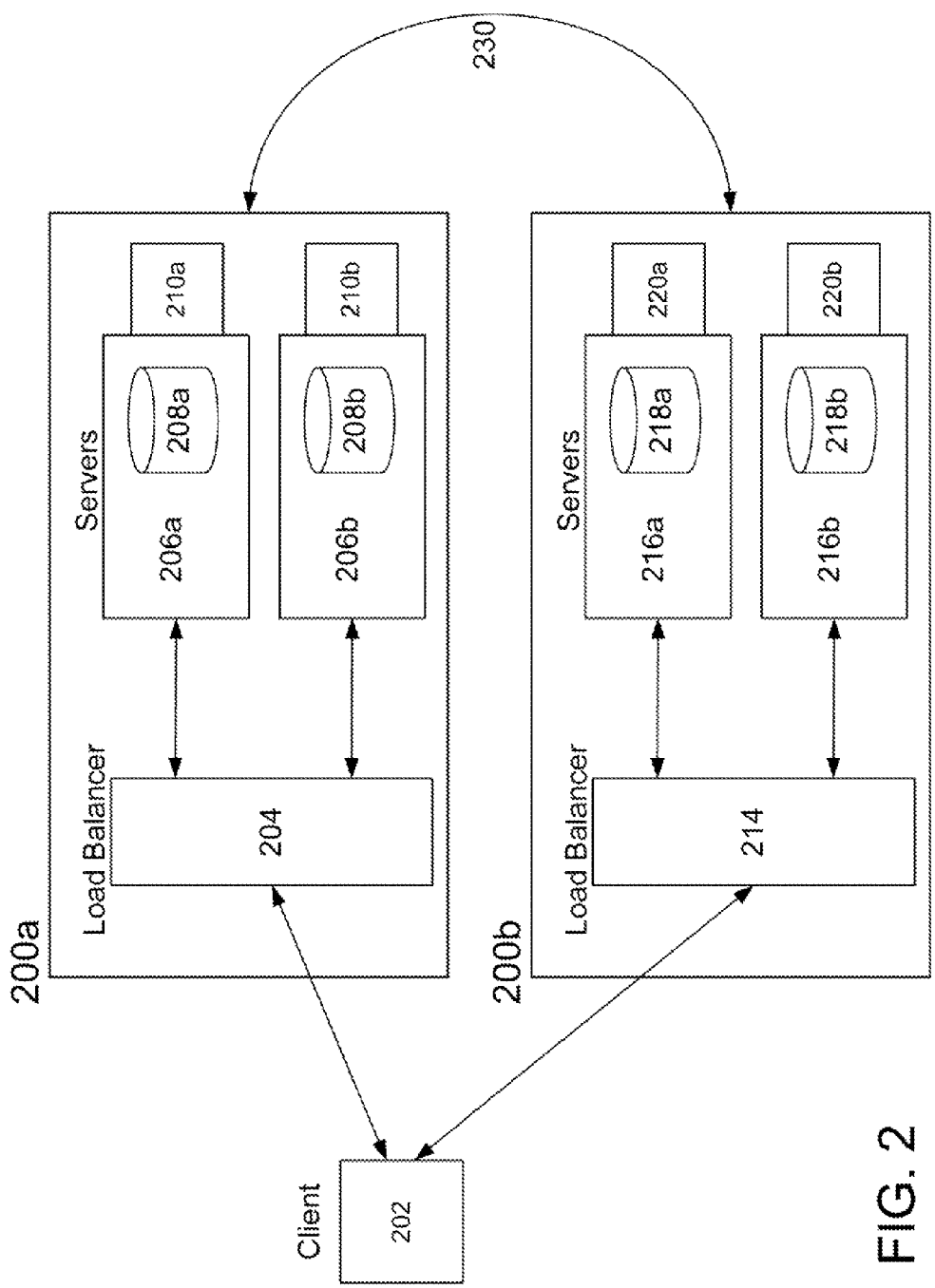
FIG. 2 illustrates an exemplary embodiment of a domain network infrastructure according to principles of the present invention.

FIG. 2 illustrates an exemplary embodiment of multiple domain network infrastructures 200a and 200b. It should be noted that the infrastructures 200a and 200b may be from the same domain, or different domains handling related materials, thus resulting in a cross-domain system capable of sharing session information.

In this example, client 202 may connect to either load balancer 204 of the infrastructure 200a, or alternatively to load balancer 214 of the infrastructure 200b. The client 202 may be a personal computing device such as a desktop computer, a laptop computer, a cell phone, or a similar device that connects to a domain via a public communications network such as the Internet, or via a private local network such as an interoffice Ethernet. A load balancer is a device that receives incoming communications and evenly distributes the communications to a series of servers or other computing devices such that no one server or computing device gets overloaded. Examples of load balances may include routers, bridges, multi-layer switches, dedicated routing servers (e.g., DNS servers), or other similar devices. It should be noted that only one client is shown in FIG. 2 by way of example only for purposes of clarity; multiple clients may be used. Additionally, the interaction between the client 202 and the infrastructure 200a will be discussed first.

As before, the client 202 may first submit a request to the load balancer 204. The load balancer may review the request, and forward the request to a domain content server 206a or 206b depending on the current usage and network traffic levels of the individual servers. A domain content server may be a server having a memory storing content specific to an individual domain. For example, a domain content server used by a network based retailer may include content related to items available for sale, individual merchants used by the retailer, customer information and any other information related to the retailer.

Figure 1:
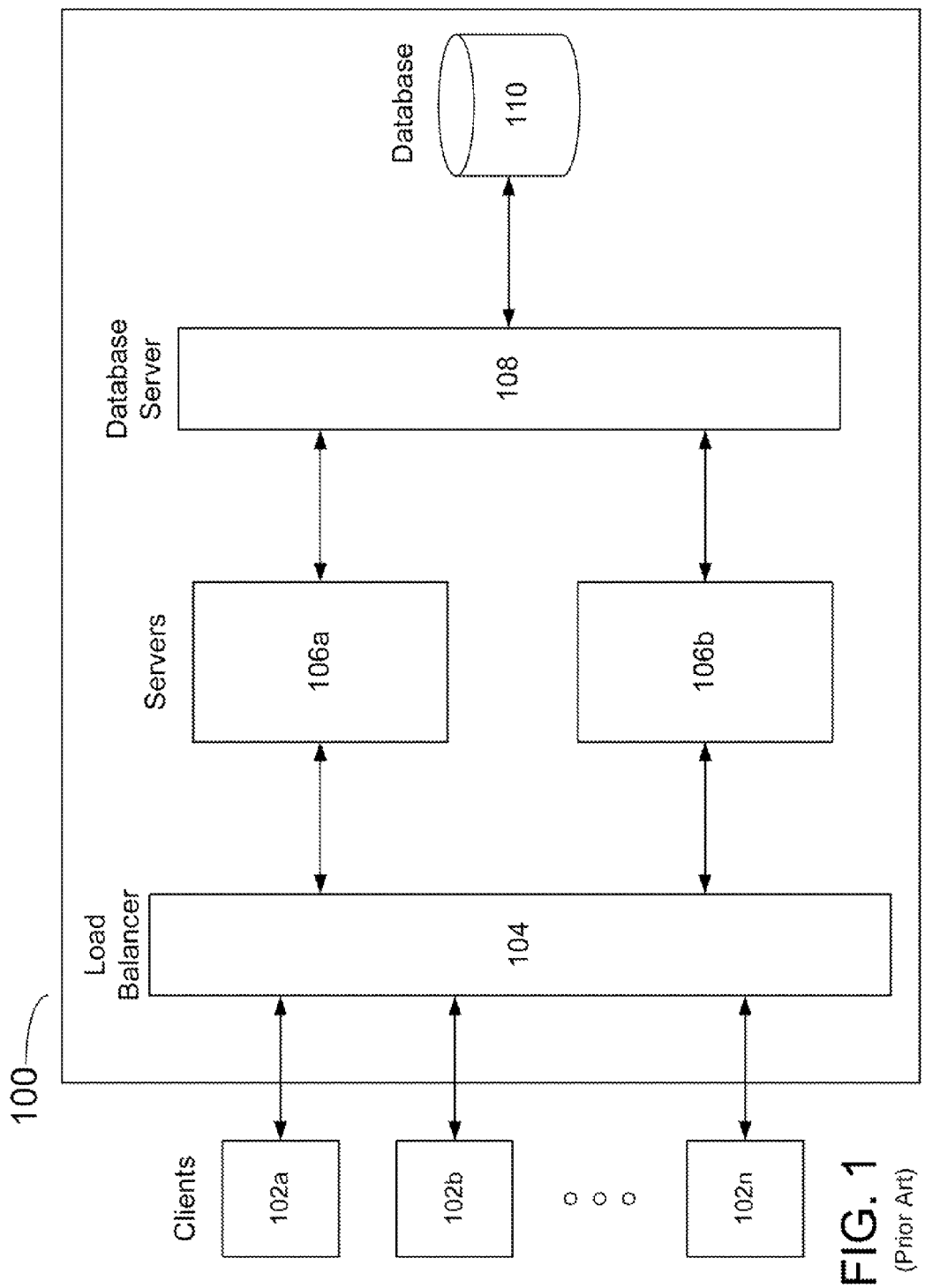
FIG. 1 illustrates an exemplary prior art domain network infrastructure.

The request may include a session ID in the header if the client 202 has already initiated a session. If the client 202 is initiating a new session, the server handling the request may issue a new session ID. A cookie may be sent to client 202 upon initiating a new session indicating the session ID and other information related to the session. This cookie may be updated throughout the session to reflect any changes to the information contained therein. It should be noted that a cookie is shown by way of example only. Additional tracking tools such as other name-value pair structures, IP address collection systems, custom URLs, HTTP authentication, or client side persistence mechanisms may be used. Additionally, the request may include a storage group identifier or mark. A storage group may be a collection of two or more servers arranged such that one server is a primary server for the storage group, and another server is the secondary server for the storage group. Each server in the storage group maintains a record of session IDs in a local database for that specific storage group, thereby providing a redundant memory system for each storage group. This differs from the arrangement discussed above as both servers 106a and 106b of FIG. 1 must rely on the database server 108 to access any session information stored in the database 110. In the storage group, should an individual server or local database fail, the secondary server may provide or use any session information from its own local database.

For locally storing session information as well as domain related content, each server may include a local storage memory, a local database or similar device. In this example, the server 206a may include a memory on which is stored a local database 208a, and the server 206b may include a memory on which is stored a local database 208b. Each server may function as both a primary storage server in a first storage group, and a secondary storage server in a second storage group. For example, in storage group A, the server 206a may be the primary storage server and the server 206b may be the secondary server. Conversely, in storage group B, the server 206b may be the primary storage server and the server 206a may be the secondary server. To reduce risk of session information data loss during a session, session information may be stored on both servers belonging to a specific group, thus reducing the chances of session information loss should one server of a storage group fail. The processing of requests and handling of session information is discussed in greater detail below in the discussion of FIG. 3.

Each server may further include a server agent. The server agent may be a software module configured to provide communication with other servers. Similarly, the server agent may be a hardware interface configured to communicate with other servers. In the example shown in FIG. 2, the server 206a may communicate with other servers via server agent 210a. Similarly, the server 206b may communicate with other servers via server agent 210b. Communications between the various server agents may include a variable level of security depending on the requirements of the individual domain infrastructures. For example, data transferred between various server agents may be protected with a public/private key pair, shared passwords, or other security provisions. The server agents may communicate with other servers in their storage group (e.g., storage group A), sharing session information such that each server in the storage group has an updated local copy of the session information. Each server in the infrastructure 200a may also have a configuration table. The configuration table may be a single, static document shared by all servers listing the relationship between each server, agent, storage group and storage group identifiers.

Similarly, client 202 may transmit a request to load balancer 214. This may occur when client 202 visits another site hosted by the domain, or visits another related domain. The load balancer 214 may review the request, and forward the request to a domain content server 216a or 216b depending on the current usage and network traffic levels of the individual servers. This request may include a session ID in the header if the client 202 has already initiated a session. If the client is initiating a new session, the server handling the request may issue a new session ID.

As before, the request may include a storage group identifier. In infrastructure 200b, the server 216a may include local database 218a, and the server 216b may include local database 218b. Again, as before, each server may function as both a primary storage server in a first storage group, and a secondary storage server in a second storage group. For example, in storage group C, the server 216a may be the primary storage server and the server 216b may be the secondary server. Conversely, in storage group D, the server 216b may be the primary storage server and the server 216a may be the secondary server. The processing of requests and handling of session information is discussed in greater detail below in the discussion of FIG. 3.

In infrastructure 200b, the server 216a may communicate with other servers via server agent 220a. Similarly, the server 216b may communicate with other servers via server agent 220b. The server agents may communicate with other servers in their storage group (e.g., storage group C), sharing session information such that each server in the storage group has an updated local copy of the session information. Additionally, the server agents may communicate with server agents in other infrastructures, such as agents 210a and 210b of infrastructure 200a. Each server in the infrastructure 200b may also have a configuration table. The configuration table may be shared between multiple domains, or remain domain specific.

Figure 3:
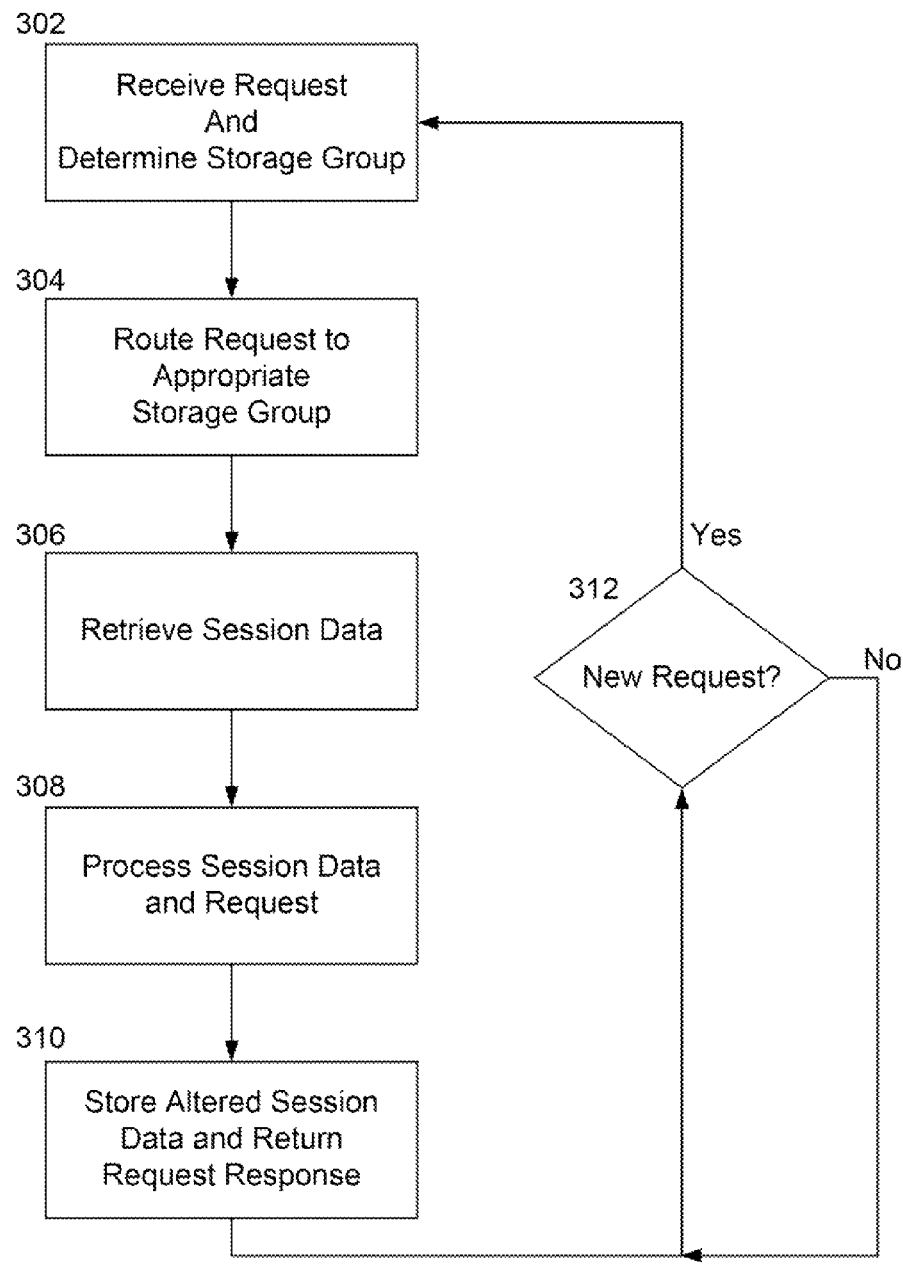
FIG. 3 illustrates a process flowchart illustrating an exemplary embodiment for handling incoming requests according to principles of the present invention.

FIG. 3 illustrates a process flowchart showing an exemplary embodiment of receiving a request and processing any accompanying session information. A load balancer may receive 302 a request from a client and determine an associated storage group. The storage group may be determined based upon a storage group mark or identifier contained in a session ID in the request. If the client is initiating a new request, the request may not include any session ID information, and the load balancer may determine a storage group based upon current traffic levels at the various servers. The load balance may then route 304 the request to either the primary or secondary server in the appropriate storage group.

The receiving server may receive the request, determine the session ID from the request, and may retrieve 306 any session data or information related to the session ID from the server's local storage. Once the session data is retrieved 306, the server may process 308 the session data along with the request. In the event there is no session ID associated with the request, the server may also assign a new session ID. After processing, the server may store 310 the altered session information and return the request response to the load balancer. The load balancer may return the request response to the client and determine if the client has issued 312 a new request.

Using the example described above in FIG. 2, the load balancer 204 may receive a request from the client 202, the request including a session ID and a storage group mark, for example, storage group mark A. The load balancer 204 may determine that storage group A includes the primary server 206a and the secondary server 206b. Depending on the traffic levels at the servers, the load balancer 204 may forward the request to one of the servers, e.g., the primary server 206a. The server 206a may load any related session data from the database 208a, and may process the session data and the request. The server 206a may return the processing results as well as a cookie indicating any changes to either the session ID of the storage group mark to the load balancer 204, which subsequently forwards the results and the cookie to the client 202. As before, cookies are used merely be way of example. Alternatively, other tracking tools may be used. The server 206a may further store a copy of the altered session data in both the database 208a and the database 208b, thus ensuring data consistency between all servers in the storage group A.

Returning again to FIG. 3, when the client issues 312 a second request, the load balance may receive 302 the second request and determine the storage group. Again, the storage group may be determined based upon the storage group mark or identifier contained in the session ID in the second request. The load balance may then route 304 the second request to either the primary or secondary server in the appropriate storage group.

The receiving server may receive the second request, determine the session ID from the request, and may retrieve 306 the altered session data previously stored before. Once the altered session data is retrieved 306, the server may process 308 the session data along with the second request. After processing, the server may store 310 the newly altered session information and returns the second request response to the load balancer. The load balancer may return the second request response to the client and determine if the client has issued 312 a new request.

Returning again to the example described above in FIG. 2, the load balancer 204 may receive a second request from the client 202, the request including a session ID and a storage group mark, for example, storage group mark A. The load balancer 204 may determine that storage group A includes the primary server 206a and the secondary server 206b. Depending on the traffic levels at the servers, the load balancer 204 may forward the request to one of the servers. In this example, the primary server 206a may not be able to process any additional traffic, and the second request is sent to the secondary server 206b. The server 206b may load any related session data from the database 208a via communication between the agents 210b and 210a, and may process the session data and the request. The server 206b may load the session data from the database 208a as it is the primary server database. Should the load fail from the database 208a, the server 206b may load the session data from the local database 208b as it is the secondary server database. The server 206b may return the processing results to the load balancer 204.

However, due to the load failure at the server 206*a*, the server 206*b* may now become the primary server, thus changing the storage group to storage group B. As such, the server 206*b* may store a copy of the altered session data in both the primary database 208*b* and the secondary database 208*a*, thus ensuring data consistency between all servers in the storage group B. Additionally, the server 206*b* may send an updated cookie back to the client 202 indicating the change in the group storage mark as a result of the promotion of the server 206*b* from secondary to primary server.

If, for some reason, a client requests a second load balancer (e.g., load balancer 214 of FIG. 2), the request may also include a storage group mark that the load balancer is not in communication with. For example, a request received by the load balance 214 may include storage group mark A (i.e., servers 206*a* and 206*b*). As the load balancer 214 is not in communication with those servers, a new session ID and storage group mark may be generated for the session. When the new session ID is generated, all other storage groups may be instructed to delete their local copies of the previous session data, as the data may be outdated. A connection 230 may connect multiple infrastructures such as 200*a* and 200*b* to facilitate the delivery of this instruction.

It should be appreciated that the exemplary infrastructures shown in FIG. 2 are shown by way of example only and may be altered depending on network requirements. For example, additional load balancers, servers and related server agents may be used depending on the size of the infrastructure. Specifically, a system may be designed where no load balancers are used. Rather, a DNS server may direct traffic to various IP addresses of the domain content servers in a round-robin approach, switching from one server to another only when a client changes domains. Similarly, additional numbers of related infrastructures/domains may be used.

It should also be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of providing access to data via a public communications network, comprising:
receiving, by a first load balancer, a first data session request having a storage group mark;
routing, by the first load balancer, the first data session request to a first domain content server that has stored data that corresponds to the storage group mark;
retrieving, by the first domain content server from the stored data, first session data that is responsive to the first data session request;
processing the first session data to result in altered first session data;
storing, by the first domain content server, the altered first session data in the stored data;
receiving, by the first load balancer, a second data session request, wherein the second data session request also has the storage group mark;
selecting, by the first load balancer, a second domain server to respond to the second data session request;
retrieving, by the second domain content server from the stored data in the first domain content server, second session data that is responsive to the second data session request;
processing the second session data to result in altered second session data;
storing the altered second session data in the stored data on the first domain content server; and
returning, by the second domain content server to the first load balancer, the altered second session data.

2. The method of claim 1, further comprising:
maintaining a plurality of additional domain content servers; and
maintaining a plurality of additional load balancers, wherein each load balancer is associated with at least one of the domain content servers.

3. The method of claim 2, wherein if the attempting to retrieve second session data from the first domain content server fails, the method also comprises:
selecting a revised storage group; and
receiving, by the second domain content server from data stored on the second domain content server, data corresponding to the second session data request and the revised storage group,
and wherein the processing the second session data comprises applying a mark associated with the revised storage group to the second session data.

4. The method of claim 3, wherein revised storage group does not include the first domain content server.

5. The method of claim 2, wherein the stored data comprises a database that resides on the first domain content server and is not stored on any of the additional domain content servers.

6. The method of claim 1, further comprising:
passing, by the first load balancer, the altered first session data to a client that initiated the first data session request.

7. The method of claim 6, further comprising:
passing, by the first load balancer, the altered second session data to a client that initiated the second data session request.

8. A system for providing access to data via a communications network, the system comprising:
at least one first load balancer configured to receive data session requests from at least one client;
a first plurality of servers operably connected to the at least one first load balancer, the first plurality of servers being operably configured into at least two storage groups with at least two servers per storage group, wherein each server has a local database configured to store information related to data session information as well as storage group information; and
a plurality of server agents, wherein each server has a unique server agent, the server agents configured to communicate with other server agents associated with servers belonging to the same storage group.

9. The system of claim 8, wherein the first plurality of servers are organized such that each storage group comprises at least a primary server and a secondary server.

10. The system of claim 8, further comprising at least one second load balancer configured to receive data requests from the at least one client.

11. The system of claim 10, further comprising a second plurality of servers operably connected to the at least one second load balancer, the second plurality of servers being organized into at least two storage groups, wherein each server has a local database configured to store information related to data session information as well as storage group information.

12. The system of claim 11, wherein the second plurality of servers are organized such that each storage group comprises at least a primary server and a secondary server.

13. A method of providing access to data via a public communications network, comprising:
- receiving, by a first load balancer, a first data session request having a storage group mark;
- routing, by the first load balancer, the first data session request to a first domain content server that has stored data that corresponds to the storage group mark;
- retrieving, by the first domain content server from the stored data, first session data that is responsive to the first data session request;
- processing the first session data to result in altered first session data;
- storing, by the first domain content server, the altered first session data in the stored data;
- receiving, by a second load balancer, a second data session request, wherein the second data session request has a second storage group mark;
- selecting, by the second load balancer, a second domain server to respond to the second data session request;
- retrieving, by the second domain content server second session data that is responsive to the second data session request;
- processing the second session data to result in altered second session data;
- storing the altered second session data in the stored data on the second domain content server;
- notifying the first domain content server to delete any session data related to the first request; and
- returning, by the second domain content server to the second load balancer, the altered second session data.

14. The method of claim 13, further comprising:
- maintaining a plurality of additional domain content servers; and
- maintaining a plurality of additional load balancers, wherein each load balancer is associated with at least one of the domain content servers.

15. The method of claim 14, wherein if the attempting to retrieve second session data from the second domain content server fails, the method also comprises:
- selecting a revised storage group; and
- receiving, by the second domain content server from data stored on the second domain content server, data corresponding to the second session data request and the revised storage group,
- and wherein the processing the second session data comprises applying a mark associated with the revised storage group to the second session data.

16. The method of claim 13, further comprising:
- passing, by the first load balancer, the altered first session data to a client that initiated the first data session request.

17. The method of claim 16, further comprising:
- passing, by the first load balancer, the altered second session data to a client that initiated the second data session request.

* * * * *